United States Patent

[11] 3,623,096

| [72] | Inventor | Guy V. Morris<br>Harbor City, Calif. |
|---|---|---|
| [21] | Appl. No. | 617,765 |
| [22] | Filed | Feb. 15, 1967 |
| [45] | Patented | Nov. 23, 1971 |
| [73] | Assignee | Hughes Aircraft Company<br>Culver City, Calif. |

[54] DEFLECTION MODULATED TARGET DISCRIMINATOR
5 Claims, 4 Drawing Figs.

[52] U.S. Cl. .................................................. 343/7.7, 343/5 EM, 343/9, 343/17.1 R
[51] Int. Cl. .................................................... G01s 9/42
[50] Field of Search ........................................... 343/5 EI, 7.7, 17.1, 9

[56] References Cited
UNITED STATES PATENTS
| 3,182,309 | 5/1965 | Hendry et al. | 343/5 EM |
|---|---|---|---|
| 3,122,738 | 2/1964 | Raabe | 343/5 EI |

Primary Examiner—T. H. Tubbesing
Attorneys—W. H. MacAllister, Jr. and George Jameson ABSTRACT: A target discriminator including a target signal source coupled to a display monitor. A modulation circuit is connected to the display monitor's deflection circuits to produce periodic shifts in the relative timing between the target signal source and the deflection signals. Target signals are displayed as multiple adjacent intensified spots on a display surface, and noise signals as single discrete intensified spots.

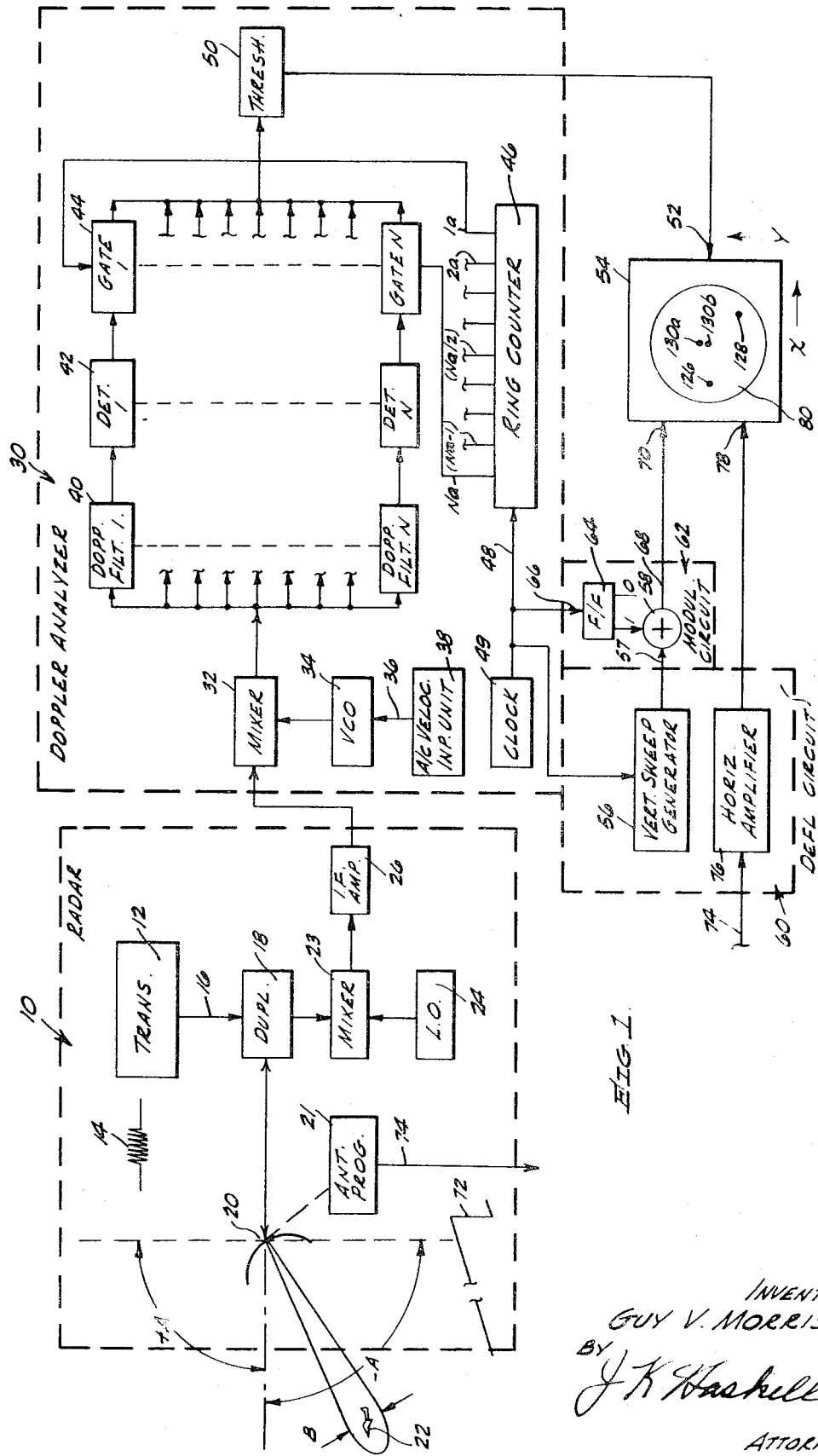

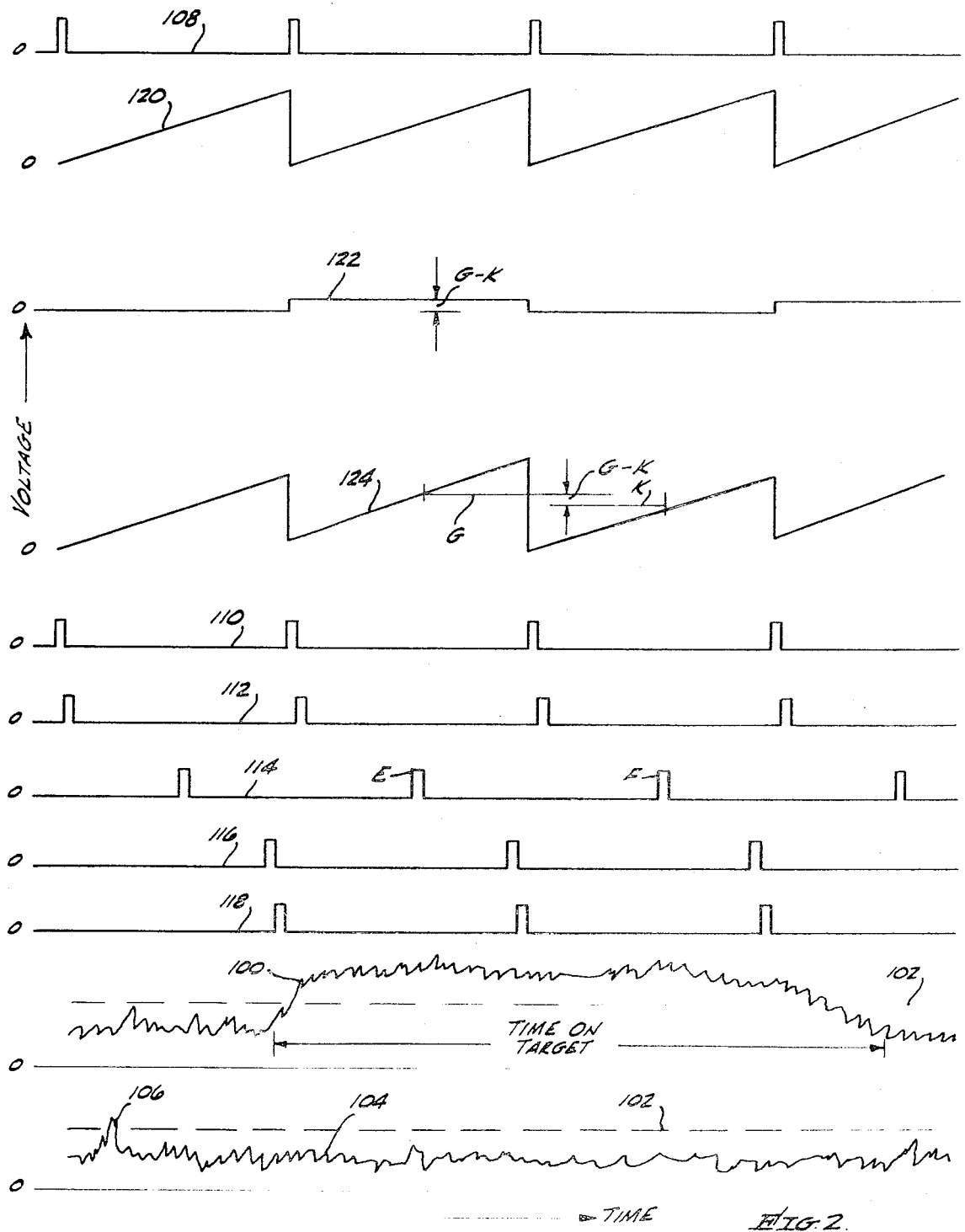
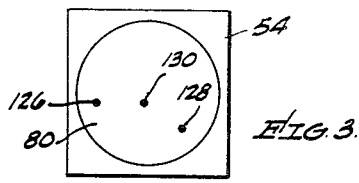
FIG. 3.
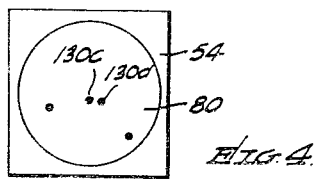
FIG. 4.

DEFLECTION MODULATED TARGET DISCRIMINATOR

BACKGROUND OF THE INVENTION

This invention relates generally to target discrimination systems and particularly to systems that discriminate between target and noise signals during a single target observation period.

Target discrimination systems broadly comprise the circuit means for discriminating target signals from noise signals and the display means for providing an indication to an operator of the presence of the target signals. Previously, this function has been mechanized by applying the target signals to a threshold circuit that produces output pulses only during the time period that the input signals exceed a selected energy level (threshold level). The output signals from the threshold circuit are utilized to intensity modulate the scanning electron beam of a display tube. This modulation of the scanning beam produces an intensified spot on the surface of the display tube that is indicative of the presence of a possible target. Because the threshold level determines the energy value below which target signals will not be displayed, a low threshold setting increases target detection range, while also increasing the probability that noise energy alone will be detected. As is well known in the art, noise energy may be introduced into the signal-processing circuits from numerous sources such as received "black body" type radiation or the thermal agitation of electrons in circuit components. The rate at which noise energy alone is detected as a target is referred to as the false alarm rate, with rates in the order of 6 per minute being a usual compromise between maximizing detection range and minimizing false target presentation due to noise power.

With conventional detection systems, an operator is unable to distinguish between a single detection due to a real target and one due to noise signals so that two detections, at the same position within a selected period of time, is required before the decision as to the existence of a real target can be reached. This additional time interval required for an operator to confirm a tar get detection has been found to be most undesirable under operational conditions. Some prior art systems have included post detection integrators in series with the target signal source to improve target detection. However, in the case of multiple output channels systems (for example doppler radars) an integrator circuit would be required for each of the separate output channels thereby greatly increasing system complexity and cost. Other prior art radar systems have provided post detection integration by utilizing the retention characteristics of the display tube phosphor, however, this approach required an increase in the dynamic range of the display intensity circuits and again an increase in system cost and complexity.

SUMMARY OF THE INVENTION

Briefly, this invention is a target discriminator that may be utilized by airborne or ground based surveillance systems to indicate the presence of a target during a single target observation period. Energy reflected from a target may be processed by a radar set and then by a doppler analyzer having a plurality of output channels. Each of the output channels includes a narrow band filter, a detector, and an output gating circuit coupled in series. The potential of each detector is sampled in response to a control signal generated by a ring counter that switches the gating circuits "on" in a selected sequence at a selected repetition rate. The output terminals of the gating circuits are coupled in parallel to an intensity control input circuit, of a display tube for intensity modulating an electron scanning beam. The position of the electron scanning beam is determined in response to a horizontal deflection signal synchronized with the horizontal scan of the radar's antenna, a vertical deflection signal synchronized with the sampling sequence of the ring counter. In response to the output signal from the gating circuits and to the horizontal and vertical deflection signals, a target is displayed on the surface of the display tube as a function of target relative velocity and angular position.

In accordance with the invention, the vertical deflection signal may be translated by a modulation circuit at a submultiple rate of the sampling frequency of the output channels of the doppler analyzer. The sampling rate is selected so that each output channel of the doppler analyzer is sampled at least twice during the time period that a target is within the beamwidth of the radar's antenna (time on target). Since the vertical deflection signal is modulated between sampling periods, a target will be displayed as a plurality of separate intensified spots on the surface of the display tube. The probability of noise power spikes occurring on successive sampling periods is negligible so that an operator is able to distinguish between real targets and noise signals during a single target observation period.

It is therefore an object of the present invention to provide a target discriminator system for discriminating between targets and noise signals during a single target observation period.

Another object is to provide a simplified target discriminator system that utilizes a display deflection modulation arrangement for discriminating target and noise signals during a single target observation period.

BRIEF DESCRIPTION OF DRAWINGS

The novel features which are believed to be characteristic of the invention both as to its organization and method of operation, together with further objects and advantages thereof, will be better understood from the following description considered in connection with the accompanying drawings in which like characters refer to like parts and in which:

FIG. 1 is a block diagram illustrating a target discrimination system with vertical deflection modulation in accordance with the principles of the invention;

FIG. 2 is a schematic diagram of voltage vs time waveforms for explaining the operation of the system in accordance with the principles of the invention;

FIG. 3 is a schematic diagram of a display surface showing a prior art target display; and FIG. 4 is a schematic diagram of a display surface showing a target display of a discrimination system with horizontal deflection modulation in accordance with the invention.

DESCRIPTION OF THE PREFERRED EMBODIMENT

Referring first to the system in accordance with the invention as shown in FIG. 1, a radar set 10 includes a transmitter 12 that generates coherent RF (radio frequency) energy pulse of a waveform 14. The pulses of energy are applied along a waveguide 16 and through a duplexer 18 to an antenna 20 which focuses and transmits the energy pulses into a sector of space of a beamwidth B. A portion of the transmitted energy that is reflected from a target 22 is intercepted by the antenna 20 and applied through the duplexer 18 to a mixer 23. A local oscillator 24 is coupled to the mixer 23 to hetrodyne the received energy to an IF frequency (intermediate frequency) which is applied through an IF amplifier 26 to an input mixer 32 of a doppler analyzer 30. The antenna 20 is mechanically coupled to a conventional antenna programmer 21 that drives the antenna in a horizontal plane through an antenna scan angle of ±A at a constant angular rate C.

A conventional voltage controlled oscillator (VCO) 34 is coupled to the mixer 32 for hetrodyning the output signal of the IF amplifier 26 to a frequency band determined by the frequency of the VCO output signal. The frequency of the VCO 34 is determined by a voltage, proportional to the velocity of the aircraft, applied through a lead 36 from an aircraft velocity input unit 38, which may be a conventional aircraft velocity transducer or an output unit of an aircraft computer system, for example.

The signal developed by the mixer 32 is applied in parallel to a plurality of doppler channels 1 through N. Each of the output or doppler channels includes a doppler filter such as 40 coupled to a detector such as 42, the output of which is applied to a gate circuit such as 44. The doppler filters may be any conventional suitable type such as described in the text "Introduction to Radar Systems," by M. I. Skolnik, McGraw-Hill Publishing Co., New York, N.Y. The detectors may be of the conventional video type and the gate circuits may comprise any suitable electronic switching circuit, such as transistor switching stages as are well known in the art. The gate circuits 1 through N are controlled by signals received from output terminals 1a through Na, respectively, of a conventional ring counter 46. In response to a reset signal received through a lead 48, the ring counter 46 applies a positive signal to a single output terminal such as 1a for a selected time period. The positive signal is then applied exclusively to output terminal 2a for the same selected time period, this operating sequence continuing towards output terminal Na at which time the reset pulse is applied through the lead 48 and the just described sequence is repeated. A detailed description of the operation of a ring counter may be found in a text authored by R. K. Richards entitled "Arithmetic Operations in Digital Computers," 1955, published by Van Nostrand, Library of Congress classification QA76.R5.

The output signals from the doppler channels 1 through N are applied in parallel to the input of a conventional threshold circuit 50 that transmits only those signals that exceed a preset energy level. The output terminal of the threshold circuit 50 is coupled to an intensity input terminal 52 of a display monitor 54.

A conventional clock 49 generates synchronization pulses that are applied through a lead 48 to the ring counter 46. The repetition rate of the clock 49 is selected so that two or more clock pulses will be generated during a single time on target period (the time on target period is defined as the antenna azimuth angular beamwidth B divided by the antenna azimuth angular scan rate C).

The output pulse from the clock 49 also synchronizes a vertical sweep generator 56 of a deflection circuit 60. In response to the synchronization pulses, the vertical sweep generator 56 produces a ramp-type voltage signal that is applied to an input terminal 57 of a voltage summation circuit 58. Also applied to the summation circuit 58 is the output signal of a flip-flop (F/F) circuit 64. The flip-flop 64 may be any suitable type having a complimentary input terminal (designated 66 in FIG. 1) such as types that are described in the previously cited text by R. K. Richards. The output terminal of the flip-flop 64 changes voltage levels (i.e., switches from a high to a low voltage level or from a low to a high voltage level) each time an input pulse is applied to the complimentary input 66 from the clock 49. An output terminal 68 of the summation circuit 58 is coupled to a vertical deflection input terminal 70 of the display monitor 54. A horizontal deflection signal, of a waveform 72, is applied from the antenna programmer 21 through a lead 74 and is then applied by a horizontal amplifier 76 to a horizontal input terminal 78 of the display monitor 54.

This display monitor 54 includes a display tube 80 that contains a scanning electron beam (not shown). The intensity of the scanning electron beam is modulated in response to the signal applied to the terminal 52 and the position of the electron beam is controlled by the deflection signals applied to the deflection input terminals 70 and 78.

In the operation of the system of FIG. 1, the transmitter 12 generates coherent pulses of RF energy at a frequency $f_o$. In accordance with the well-known doppler effect, the energy pulses are reflected from the target 22 at a frequency $f_o+f_a+f_t$ where $f_a=2V_a/\lambda$ and $f_t=2V_t/\lambda$; $V_a$ is the velocity of the platform aircraft relative to the ground and $V_t$ is the velocity of the target relative to ground. At the output terminal of mixer 23, the frequency of the received energy is $(f_o-f_{Lo})+f_a+f_t$ which may be expressed as $f_{If}+f_a+f_t$. The VCO 34, which is controlled by a voltage proportional to $V_a$ produces a signal $f_a$ that is hetrodyned with the received signal in the mixer 32 producing a signal of frequency $f_{If}+f_t$ which is applied in parallel to the doppler filters 1 through N. Therefore, the received energy processed by the doppler filter channels is offset from a preselected IF frequency ($f_{If}$) by an amount proportional to the relative velocity between the target and the ground. If the system of FIG. 1 is utilized as a part of a stationary ground base surveillance system, $f_a$ will be zero and the mixer 32, the voltage control oscillator 34, and the aircraft velocity input unit 38 may be eliminated and the output signal of the IF amplifier 26 applied directly to the input terminals of the doppler filters.

The center frequency and the bandwidth of the doppler filters 1 through N may be designed in accordance with the conventional techniques described in the previously cited text by M. I. Skolnik and the number of doppler channels is determined by the expected range of relative target velocities. For example doppler filters 1 to N/2 may have a center frequency below $f_{If}$ with filter 1 being centered at the lowest frequency corresponding to the maximum expected opening rate between the aircraft and the target. The filters from N/2 to N may have center frequencies greater than $f_{If}$ with the filter N being centered at the highest frequency corresponding to the maximum closing rate between the aircraft and the target.

A target signal will produce an output signal in the filter that encompasses the frequency zone of the target's signal spectrum and the output from the detector of that particular channel may have the voltage vs time characteristics shown by a waveform 100 of FIG. 2. As shown in the waveform 100, the output of the detector channel containing the target signal exceeds the threshold level (indicated by a dashed line 102), during a substantial portion of the time on target period. A waveform 104 of FIG. 2 shows the output signal of a detector that contains only noise signals. The noise signals may exceed the threshold level 102 for a short time period, for example during the occurrence of a noise spike 106 of the waveform 104; however, it is very improbable that noise signals alone will exceed the threshold level for any extended time period or that they will occur at the same relative time interval during consecutive sampling time periods.

The output pulses from the clock 49 shown by a waveform 108 of FIG. 2 are applied to ring counter 46 and as explained previously, ring counter 46 produces positive signals at only one output terminal at a time. A waveform 110 shows the output voltage vs time characteristics, of terminal "1a" of ring counter 46, as being positive for a short period after the occurrence of each clock pulse. A waveform 112 shows the waveform, at output terminal "2a" of ring counter 46, as a positive pulse tat begins in coincidence with the termination of the pulse at the 1a terminal. The signal at output terminals Na/2, (Na−1) and Na are shown by waveforms 114, 116, and 118, respectively of FIG. 2.

The clock 49 also synchronizes the vertical sweep generator 56 that produces the vertical deflection signals shown by a waveform 120. The period of the vertical deflection signals is the same as the repetition rate of the ring counter 46 (waveforms 110, 112, 114, 116, and 118). The signals from the output terminals of the ring counter 46 gate the output signals of the doppler channels 1 through N to the display intensity input terminal 52 in a time sequence from the lowest frequency channel "1" to the highest frequency channel N; and so targets are displayed in the Y dimension on the surface of the display tube 80 as a function of the relative velocity between the aircraft and the target. The horizontal deflection signal applied to the deflection terminal 78 is representative of the angular position of the antenna 20 so that the target position in the X dimension on the surface of the display tube 80 is indicative of the target's angular position relative to the aircraft.

The flip-flop 64 is also synchronized by the clock 49, and in response thereto produces the output signals shown by a waveform 122 that changes between a zero and a positive voltage level each clock pulse. This output signal of the flip-flop 64 is summed with the deflection signal of the waveform 120 in the summation circuit 58 and the signal applied to the vertical deflection terminal 70 is shown by a waveform 124.

In operation of the system of FIG. 1, is a target signal of a waveform 100 (FIG. 2) is applied to a particular doppler cannel, for example channel N/2, it will be gated to the intensity input terminal 52 during the period that the Na/2 output terminal of ring counter 46 is positive (the period labeled E and F in waveform 114). At the time of occurrence of the gating signal E, the vertical deflection signal (waveform 124) is at some potential level G and at the time of occurrence of the gating signal F the vertical deflection signal is at some different potential level K. This deflection difference (G—K) will produce two separate intensified spots on the display tube 80 (FIG. 1) as indicated by dots 130a and 130b. Consequently, the operator may distinguish between target signals and noise produced intensified spots (represented by dots 126 and 128 on the display tube 80, FIG. 1) during a single time on target period. In prior art systems, the target signal is displayed as a single intensified spot 130 on the display tube 80 as shown in FIG. 3 and would be undistinguishable from noise points 126 and 128.

Although only one embodiment of the invention has been described herein, it will be appreciated by those skilled in the art that other arrangements may be used in accordance with the principles of the invention. For instance, the output signal of the vertical sweep generator 56 may be applied directly to the vertical deflection terminal 70 and the terminals 57 and 58 of the summation circuit 68 may be connected in series between the horizontal amplifier 76 and the horizontal deflection input terminal 78. In this just described embodiment, the horizontal deflection signal is modulated and a target signal will be displayed as two intensified spots displaced in the horizontal dimension, as shown by dots 130c and 130d of FIG. 4. Also, the summation circuit 58 may be coupled between the aircraft velocity input unit 38 and the VCO 34, instead of between deflection circuits 60 and the display monitor 54. In this latter embodiment the target signal frequency at the output of the mixer 32 will be periodically translated resulting in a shift of the target signal between doppler filter channels and thereby producing a vertical target displacement on the display tube 80 shown in FIG. 1. Further, it is not necessary that the modulating or dividing element (flip-flop 64 of the embodiment of FIG. 1) be synchronized by the clock 49 and as asynchronous oscillator such as a conventional monostable multivibrator may be utilized to modulate the output signal of the summation circuit 58 at a submultiple rate of the clock frequency.

Thus, there has been described a deflection modulated target discriminator system that discriminates between target and noise signals during a single target observation period. The system is less complex than conventional target discriminators that utilize post detection integrators and thus does not increase the dynamic range requirements of the display intensity circuits.

What is claimed is:

1. A target detection system comprising:
a radar system having first and second output circuits;
a doppler analyzer having an input circuit coupled to the first output circuit of the said radar system and having a first and second output circuit;
a deflection circuit having first and second input circuits and first and second output circuits with said first input circuit being coupled to the second output circuit of said radar system, and said second input circuit being coupled to the second output circuit of said doppler analyzer;
a division circuit having an input circuit coupled to the second output circuit of said doppler analyzer and having an output circuit;
a summation circuit having a first input circuit coupled to the first output circuit of said deflection circuit, having a second input circuit coupled to the output circuit of said division circuit and having an output circuit; and
a display monitor having a signal input circuit coupled to the first output circuit of said doppler analyzer, having a first deflection input circuit coupled to the output circuit of said summation circuit and having a second deflection circuit coupled to the second output circuit of said deflection circuit.

2. A target detection system comprising:
a radar system having first and second output circuits;
a doppler analyzer having an input circuit coupled to said first output circuit of said radar system and having first and second output circuits;
a deflection circuit having first and second input circuits and first and second output circuits; with said fist input circuit being coupled to the second output circuit of said radar system, and said second input circuit being coupled to the second output circuit of said doppler analyzer;
a bistable circuit having an input circuit coupled to the second output circuit of said doppler analyzer and having an output circuit;
a summation circuit having a first input circuit coupled to the second output circuit of said deflection circuit, having a second input circuit coupled to the output circuit of said division circuit and having an output circuit; and
a display monitor having a signal input circuit coupled to the first output circuit of said doppler analyzer, having a first deflection input circuit coupled to the first output circuit of said deflection circuit and having a second deflection input circuit coupled to the output circuit of said summation circuit.

3. A target detection system comprising:
a source of target signals;
deflection means coupled to and synchronized by said source of target signals for generating first and second deflection signals;
modulation means coupled to said deflection means for periodically shifting the potential of one of said deflection signals, with said modulation circuit having a bistable circuit coupled in series with a summation circuit; and
display means coupled to said source of target signals and to said modulation means for displaying target signals.

4. The system of claim 3 wherein said bistable circuit is coupled to and controlled by said source of target signals.

5. A system for discriminating between repetitive target signals and random noise signals comprising:
a source of target signals;
deflection means coupled to and synchronized by said source of target signals for generating first and second deflection signals;
modulation means coupled to said deflection means for periodically shifting the potential of one of said first and second deflection signals, said modulation means including a division circuit coupled in series with a summation circuit, with said division circuit being synchronized by said source of target signals; and
display means coupled to said source of target signals and to said modulation means for displaying target signals.

* * * * *